(12) United States Patent
Tsuda

(10) Patent No.: US 9,939,912 B2
(45) Date of Patent: Apr. 10, 2018

(54) DETECTION DEVICE AND GESTURE INPUT DEVICE

(71) Applicant: DENSO CORPORATION, Kariya, Aichi-pref. (JP)

(72) Inventor: Yoshiyuki Tsuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 66 days.

(21) Appl. No.: 15/112,715

(22) PCT Filed: Jan. 29, 2015

(86) PCT No.: PCT/JP2015/000391
§ 371 (c)(1),
(2) Date: Jul. 20, 2016

(87) PCT Pub. No.: WO2015/133057
PCT Pub. Date: Sep. 11, 2015

(65) Prior Publication Data
US 2016/0349850 A1    Dec. 1, 2016

(30) Foreign Application Priority Data

Mar. 5, 2014 (JP) ................................. 2014-043142
Mar. 21, 2014 (JP) ................................. 2014-059332
Apr. 4, 2014 (JP) ................................. 2014-077882

(51) Int. Cl.
*G06F 3/042* (2006.01)
*G06F 3/01* (2006.01)
*B60K 37/06* (2006.01)

(52) U.S. Cl.
CPC .............. *G06F 3/017* (2013.01); *B60K 37/06* (2013.01); *B60K 2350/1052* (2013.01); *B60K 2350/901* (2013.01); *B60K 2350/928* (2013.01)

(58) Field of Classification Search
CPC ... G06F 3/017; B60K 37/06; B60K 2350/901; B60K 2350/1052; B60K 2350/928
See application file for complete search history.

(56) References Cited

U.S. PATENT DOCUMENTS

| 2013/0063336 | A1* | 3/2013 | Sugimoto | B60K 35/00 345/156 |
| 2015/0131857 | A1* | 5/2015 | Han | G06K 9/00389 382/103 |
| 2016/0171320 | A1* | 6/2016 | Nagata | G06K 9/00604 348/78 |

FOREIGN PATENT DOCUMENTS

| JP | 2001216069 A | 8/2001 |
| JP | 2003067108 A | 3/2003 |

(Continued)

*Primary Examiner* — Adam R Giesy
(74) *Attorney, Agent, or Firm* — Harness, Dickey & Pierce, P.L.C.

(57) ABSTRACT

A detection device installed to a vehicle to detect a gesture of a finger of an operator includes: a detection portion disposed to a steering column of the vehicle or in close proximity to the steering column to detect a space within a predetermined range toward a steering wheel; and a switch portion arranged behind the steering wheel and operated by the operator. The detection portion determines whether the input signal is inputted from the switch portion within a fixed time period after the detection portion detects the gesture of the finger of the operator. The gesture is made valid when the input signal fails to be inputted into the detection portion. The gesture is made invalid when the input signal is inputted into the detection portion.

1 Claim, 11 Drawing Sheets

(56) References Cited

FOREIGN PATENT DOCUMENTS

| | | | |
|---|---|---|---|
| JP | 2005047412 | A | 2/2005 |
| JP | 2005063092 | A | 3/2005 |
| JP | 2006209563 | A | 8/2006 |
| JP | 2006282145 | A | 10/2006 |
| JP | 2006335112 | A | 12/2006 |
| JP | 2007164814 | A | 6/2007 |
| JP | 2009248629 | A | 10/2009 |
| JP | 2010254199 | A | 11/2010 |
| JP | 2013022986 | A | 2/2013 |
| JP | 2013218391 | A | 10/2013 |

* cited by examiner

ARRANGEMENT 1

ARRANGEMENT 1

ARRANGEMENT 4

ARRANGEMENT 5

ARRANGEMENT 6

FIG. 10
SENSOR USED AND OBTAINABLE GESTURE
|  | 2D SENSOR | 3D SENSOR |
|---|---|---|
| ARRANGEMENT 1 | × | LEFT/RIGHT · UP/DOWN |
| ARRANGEMENT 2 | LEFT/RIGHT | LEFT/RIGHT · UP/DOWN |
| ARRANGEMENT 3 | × | LEFT/RIGHT · UP/DOWN |
| ARRANGEMENT 4 | × | LEFT/RIGHT · UP/DOWN |
| ARRANGEMENT 5 | LEFT/RIGHT | LEFT/RIGHT · UP/DOWN |
| ARRANGEMENT 6 | × | LEFT/RIGHT · UP/DOWN |
FIG. 11
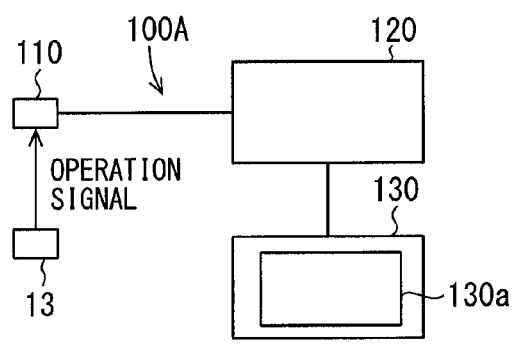
FIG. 12
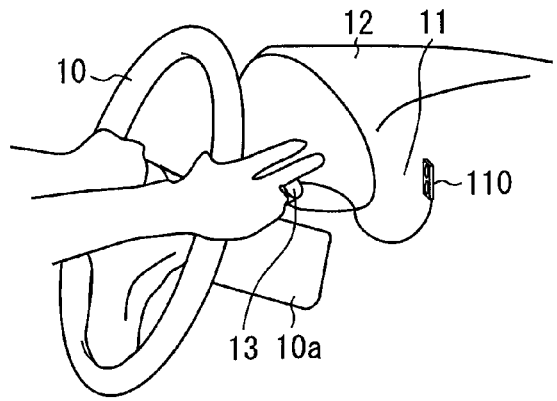

DETECTION DEVICE AND GESTURE INPUT DEVICE

CROSS REFERENCE TO RELATED APPLICATIONS

This application is a U.S. National Phase Application under 35 U.S.C. 371 of International Application No. PCT/JP2015/000391 filed on Jan. 29, 2015 and published in Japanese as WO 2015/133057 A1 on Sep. 11, 2015. This application is based on and claims the benefit of priority from Japanese Patent Application No. 2014-043142 filed on Mar. 5, 2014, Japanese Patent Application No. 2014-059332 filed on Mar. 21, 2014, and Japanese Patent Application No. 2014-077882 filed on Apr. 4, 2014. The entire disclosures of all of the above applications are incorporated herein by reference.

TECHNICAL FIELD

The present disclosure relates to a detection device detecting a gesture operation of an operator and a gesture input device enabling an input by gesture of an operator.

BACKGROUND ART

An operation input device described in Patent Literature 1 includes a camera that captures an image around a driver's seat. A gesture of a hand of an operator is detected from an image captured by the camera. An operation intended by the operator is determined from the detected gesture. Also, a device installed to a vehicle is operated according to the determined operation.

More specifically, a first operation region corresponding to an upper part of a steering wheel, a second operation region corresponding to an upper part of a dashboard, or the like is preliminarily set within a region captured by the camera. For example, when the operator (driver) wishes to make an input into a navigation device, the operator becomes able to make a selection or a determination from various navigation-operation menu items (first attribute, second attribute, and so on) by making an operation (gesture), relative to the upper part of the steering wheel (first operation region) or the upper part of the dashboard (second operation region), such as by rubbing two stretched fingers or by touching the upper part with one finger.

In the operation input device described in Patent Literature 1, a predetermined mark is put on the steering wheel and it is detected whether the mark is displaced from a home position (whether the steering wheel is turned). While the steering wheel is turned, a detection of a gesture is not performed on the assumption that the operator is driving.

In an interface device described in Patent Literature 2, a motion of a target part of a user is captured by an imaging camera, and a direction, a speed, acceleration and the like of the motion of the particular target part of the user are detected from an obtained moving image. The interface device outputs an operation command corresponding to the detected motion and displays a changing of states of an electronic device provided with a display device on a display screen of a display.

More specifically, the user specifies a reference position by holding a palm over the imaging camera equipped to the display device for several seconds. Then, the reference position is inputted into an electronic device main body and a menu operation screen is displayed on the display device. Subsequently, the user makes a hand gesture by quickly sweeping the palm to the right (or to the left), relaxing the hand, slowly returning the palm to the reference position, and resting the palm at the reference position. Objects displayed on the menu operation screen of the display device are scrolled to the right (or to the left) by one unit (by one object) and the object scrolled to the reference position is selected. Further, when the user moves the palm toward the display device (imaging camera), a state of the object is changed from a selected state to a determined state.

PRIOR ART LITERATURES

Patent Literature

Patent Literature 1: JP 2013-218391 A
Patent Literature 2: JP 2006-209563 A

SUMMARY OF INVENTION

According to Patent Literature 1, however, an operation burden is high because when the operator makes an input operation while driving, the operator has to move the hand off the steering wheel to place the hand to the predetermined operation region. In addition, because the operator has to move the hand off the steering wheel while driving, concern remains for safety of driving.

In a case where the vehicle is traveling a gentle curve with a constant radial distance, the operator has to make a rotational operation on the steering wheel where the curve begins but the operator continues to drive the vehicle by keeping the steering wheel at the rotated position. In a case where a detection of a gesture is not performed whenever a rotational operation is made on the steering wheel as in Patent Literature 1, convenience for the operator is reduced. Conversely, it is not preferable to enable an input by a gesture when a rotational operation on the steering wheel is tough for reason of safety of driving.

Patent Literature 2 describes that "it is preferable that the user returns the palm to the reference position without intending to let the palm be captured by the camera". Such a technical idea, however, indicates that an input condition when the user returns the palm is quite ambiguous. For example, when the user returns the palm swiftly after the user sweeps the palm to the right (or to the left), it may be erroneously recognized that the user made an input in an opposite direction. That is to say, when the user wishes to scroll the objects in succession in one direction, the objects may be scrolled back and forth repetitively due to erroneous recognition. The user thus becomes unable to make input operations of a same content in series. Moreover, when the user moves the palm unconsciously when making an action of some sort, a motion of the palm may be recognized as an input operation in one direction and the objects may be scrolled against the user's intention.

An object of the present disclosure is to provide a detection device capable of reducing an operation burden incurred with a gesture input while making a contribution to safety of driving, and a gesture input device capable of enhancing ease of operation by increasing a degree of recognition accuracy of an input by a gesture.

Another object of the present disclosure is to provide a gesture input device capable of making an input by a gesture more convenient while ensuring safety of driving.

According to an aspect of the present disclosure, a detection device installed to a vehicle to detect a gesture of a finger of an operator includes: a detection portion disposed to a steering column behind a steering wheel of the vehicle or in close proximity to the steering column to detect a space within a predetermined range toward the steering wheel; a switch portion arranged behind the steering wheel and operated by the operator; and a control portion into which an input signal is inputted from the switch portion. The control portion makes a detection of the gesture invalid when the input signal is inputted into the control portion in case where the detection portion detects the gesture in the space within the predetermined range.

When the operator who is holding the steering wheel stretches any one of fingers of hands holding the steering wheel toward the space within the predetermined range, the detection device becomes capable of detecting a motion of the finger as a gesture. The operator is thus able to make an input operation without having to move the hand off the steering wheel while driving. Consequently, an operation burden incurred with a gesture input can be reduced and hence a contribution to safety of driving can be made.

A detection target of the detection device is the space within the predetermined range from where the detection device is located toward the steering wheel. Hence, motions of fingers of the operator who is holding the steering wheel are not normally captured as a gesture. Consequently, erroneous recognition can be prevented.

According to an aspect of the present disclosure, a gesture input device includes: an action detection portion detecting a motion of a particular part of a body of an operator and detecting an action of the particular part in one direction and an action in an opposite direction to the one direction; a determination portion determining whether the action in one direction and the action in the opposite direction are detected in series within a predetermined time set in advance; and a recognition portion recognizing the action in one direction and the action in the opposite direction as a single gesture when the determination portion determines that the action detection portion detects the action in one direction and the action in the opposite direction in series within the predetermined time.

An action in one direction or an action in the opposite direction is not recognized independently. That is to say, the operator becomes able to make a desired single input operation with a reciprocating action by making an action in one direction and an action in the opposite direction as a single gesture. Hence, an input by an action in one direction and an input by an action in the opposite direction alternate in the reciprocating action without confusion and single input operations can be made in series by repeating the reciprocating action as one unit.

Even when the driver moves the particular part unconsciously when making an action of some sort, such a motion of the particular part is not recognized as a single gesture unless both of an action in one direction and an action in the opposite direction are detected. Hence, making an unintended input operation can be limited.

As has been described, because a degree of recognition accuracy of an input by a gesture of the operator can be increased, ease of operation can be enhanced.

According to an aspect of the present disclosure, a gesture input device includes: an action detection portion detecting a motion of a particular part of a body of an operator and detecting an action of the particular part in one direction and an action in an opposite direction to the one direction; a reset portion erasing a history of the action in one direction detected by the action detection portion unless the action in the opposite direction is detected after a detection of the action in one direction in series within a predetermined time set in advance; and a recognition portion recognizing the action in one direction and the action in the opposite direction as a single gesture when the action in one direction and the action in the opposite direction are detected in series within the predetermined time.

The reset portion erases a history of an action in one direction detected by the action detection portion unless an action in the opposite direction is detected after a detection of an action in one direction in series within the predetermined time set in advance. Hence, an input is not made unless the driver makes an action in the opposite direction following an action in one direction within the predetermined time set in advice. Consequently, an input of an erroneous action can be prevented in a reliable manner.

The recognition portion recognizes an action in one direction and an action in the opposite direction as a single gesture when the action in one direction and the action in the opposite direction are detected in series within the predetermined time. That is to say, the operator becomes able to make a desired single input operation with a reciprocating action by making an action in one direction and an action in the opposite direction as a single gesture.

According to an aspect of the present disclosure, a gesture input device includes: a detection portion installed to a vehicle and detecting a gesture of a particular part of a body of an operator; a steering angle sensor detecting a steering angle when the operator steers a steering wheel of the vehicle; and a control portion enabling and disabling an input of the gesture detected by the detection sensor on a basis of an angular velocity obtained from the steering angle detected by the steering angle sensor and disabling an input of the gesture when the angular velocity is as high as or higher than a threshold set in advance.

When the angular velocity obtained from the steering angle sensor is as high as or higher than the threshold, it means that the operator is making a considerably large rotational operation on the steering wheel. The control portion therefore disables an input of a gesture. Hence, because the operator is able to concentrate on the driving of the vehicle, a contribution to safety of driving can be made.

On the other hand, when the angular velocity obtained from the steering angle sensor is lower than the threshold, a rotational operation on the steering wheel by the operator is small and a sufficient time is left for the operator to make a gesture. By enabling an input of a gesture as originally designed in such a case, an input by a gesture of the operator can be more convenient.

BRIEF DESCRIPTION OF DRAWINGS

FIG. 10 is a table showing types of sensors and available gesture operations;

FIG. 11 is a block diagram showing an operation input device according to a second embodiment;

FIG. 12 is a perspective view showing a relation between a sensor and a turn-signal lever in the second embodiment;

DESCRIPTION OF EMBODIMENTS

Figure 1:
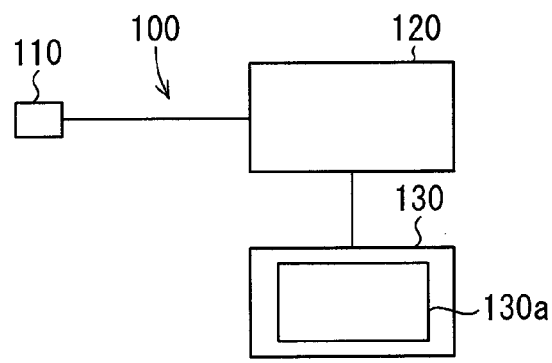
FIG. 1 is a block diagram showing an operation input device according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A detection device 110 of a first embodiment will be described using FIG. 1 through FIG. 4. The detection device 110 of the present embodiment is applied to an operation input device 100 installed to a vehicle.

The vehicle is provided with a steering wheel 10 used to steer the vehicle and a steering column 10a enclosing a steering shaft behind the steering wheel 10 (front side of the vehicle). Also, an instrument panel 11 is provided behind the steering wheel 10. A combination meter 12 collectively displaying various types of vehicle information is provided to the instrument panel 11 and located so as to oppose an upper half of the steering wheel 10. A turn-signal lever 13 operated by a right hand of a driver to flick on an indicator indicating that the vehicle is going to make a right or left turn is provided to the steering column 10a on a right side when viewed in a vehicle travel direction.

The operation input device 100 includes the detection device 110, a control portion 120, and a vehicle device 130. On the basis of a motion of a body of a driver (operator) detected by the detection device 110, the control portion 120 switches a display image on a display portion 130a of the vehicle device 130 and makes an operation input to the vehicle device 130.

The detection device 110 is also a detection portion detecting a motion of the body of the driver. For example, the detection device 110 captures a part (hand, finger, and so on) of the body of the driver in a three-dimensional image and detects a motion of the part of the body of the driver from a change in images with time. The detection device 110 can be, for example, a near infrared sensor using near infrared light or a far infrared sensor using far infrared light. Hereinafter, the detection device 110 is referred to as the sensor 110.

Figure 2:
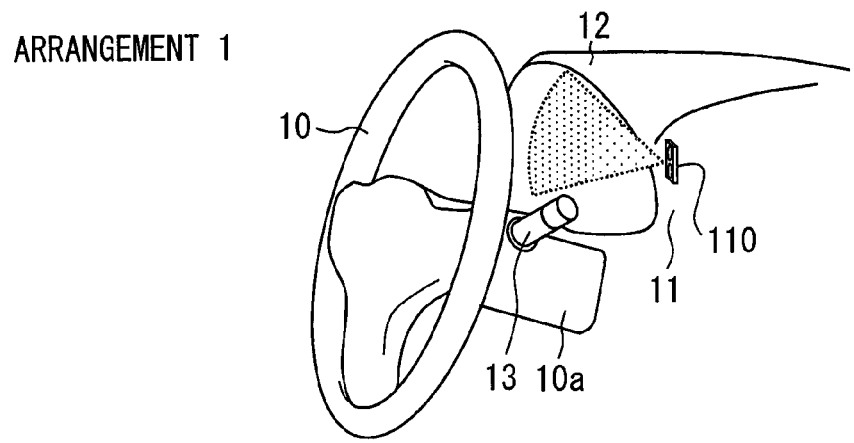
FIG. 2 is a perspective view indicating a position (first location) of a sensor in the first embodiment.

As are shown in FIG. 1 and FIG. 2, the sensor 110 is located in the instrument panel 11 provided behind the vehicle steering wheel 10 in close proximity to the steering column 10a. More specifically, the sensor 110 is located so as to oppose a right hand of the driver who is holding the steering wheel 10 with right and left hands placed at 2 o'clock position and 10 o'clock position respectively when viewed in the vehicle travel direction from a driver's seat. Hence, an optical axis of the sensor 110 extends substantially in a horizontal direction from the instrument panel 11 to in front of (back surface of) the steering wheel 10.

Figure 3:
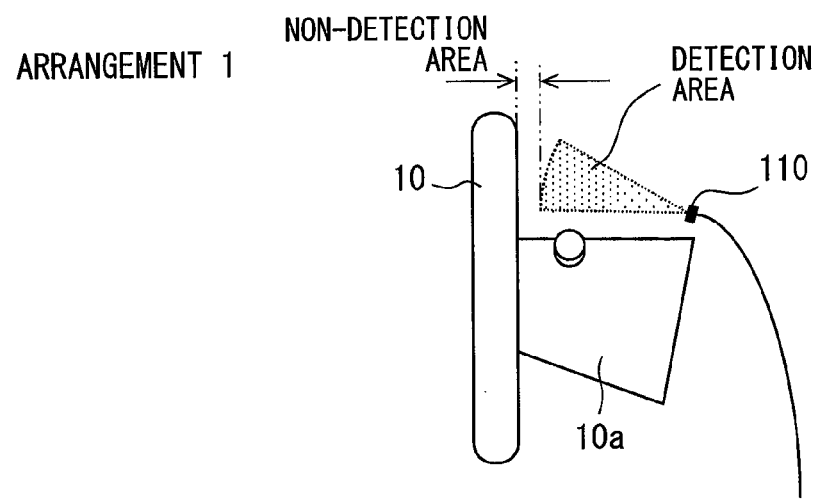
FIG. 3 is a side view indicating the position (first location) of the sensor in the first embodiment.

As is shown in FIG. 3, a detection target region of the sensor 110 is a spatial region within a predetermined range from where the sensor 110 is disposed to the steering wheel 10. Hereinafter, the target region is referred to as the detection area. A space between a tip end of the detection area and the back surface of the steering wheel 10 is a non-detection area. The non-detection area is an area within which fingers holding the steering wheel 10 are present during a normal driving operation. Accordingly, motions of the fingers holding the steering wheel 10 are not detected by the sensor 110.

Figure 4:
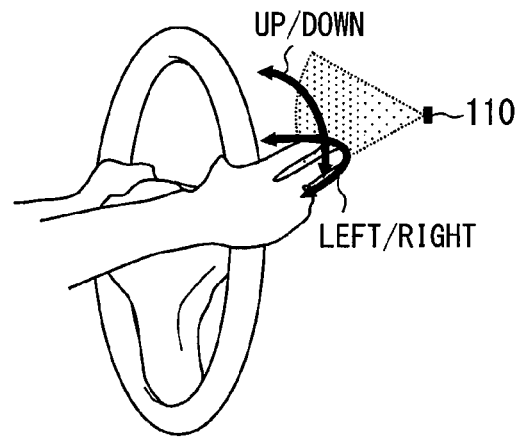
FIG. 4 is a perspective view showing a gesture of fingers in the first embodiment.

The detection area is therefore an area within which a motion of any finger of the driver is detected when the finger enters from the non-detection area. For example, when the driver stretches a right forefinger and a right middle finger together as shown in FIG. 4 or the right forefinger or the right middle finger alone toward the sensor 110, each finger enters the detection area. The sensor 110 thus detects a motion of the finger of the right hand of the driver.

Various patterns may be preliminary assigned as motions of a finger (hereinafter, referred to as a gesture). However, for ease of description, for example, the gesture used herein is to shake a finger in a right-left direction or to move a finger in a top-bottom direction. Each gesture resembles, for example, a swipe operation on a screen of a smartphone. A gesture signal of a finger detected by the sensor 110 is outputted to the control portion 120 described below.

Referring to FIG. 1 again, upon receipt of the finger gesture signal from the sensor 110, the control portion 120 performs a display control on the display portion 130a of the vehicle device 130 and an operation control on the vehicle device 130. In the control portion 120, control contents are preliminarily determined for finger gesture signals. That is to say, the control portion 120 generates a display image necessary for the display portion 130a and further switches a display image while changing an operation state of the vehicle device 130 according to the finger gesture signals.

The vehicle device 130 is, for example, an integral unit of a navigation device furnished with an audio function and an air-conditioning input device via which to input an operation condition for a vehicle air-conditioning device. The vehicle device 130 includes the display portion 130*a* and is disposed in the instrument panel 11 at, for example, substantially a center in a vehicle right-left direction.

The display portion 130*a* is, for example, a liquid crystal display or an organic EL display. The display portion 130*a* displays a main menu, namely, selection switches representing a navigation device, an audio device, and an air-conditioning device and aligned side by side in the right-left direction to let the driver select a desired device.

When the navigation function is used, the display portion 130*a* displays a navigation image, such as a map image used for route guidance, a vehicle location image, a destination search image, and a destination navigation image by, for example, texts or figures. When the audio function is used, the display portion 130*a* displays an audio image, such as a song list and a volume adjusting switch. When the function as the air-conditioning input device is used, the display portion 130*a* displays an air-conditioning image, such as a preset temperature switch, an air volume adjusting switch, an air-blow mode switching switch, an inside and outside air switching switch, and a current operating state.

In the present embodiment, a gesture of a finger in the right-left direction is, for example, a gesture to make a selection from the functions furnished to the vehicle device 130. A gesture of a finger in the top-bottom direction is, for example, a gesture to zoom in and out the map image in the case of the navigation image, a gesture to operate the volume adjusting switch in the case of the audio image, and a gesture to operate the preset temperature switch in the case of the air-conditioning image.

More specifically, when the driver driving the vehicle by holding the steering wheel 10 makes a gesture of a finger in the right-left direction by stretching the right forefinger and the right middle finger (FIG. 4) or either the right forefinger or the right middle finger alone toward the sensor 110, the fingers enter the detection area. The sensor 110 thus detects the gesture of the fingers in the right-left direction. A gesture signal of the right-left direction is outputted to the control portion 120. The control portion 120 changes any one of the selection switches into a selected and determined state by switching a display on the display portion 130*a* sequentially from the navigation image to the audio image to the air-conditioning image each time the driver moves the fingers to the right or to the left.

When the driver makes a gesture of the fingers in the top-bottom direction (FIG. 4), the sensor 110 detects the gesture of the fingers in the top-bottom direction. A gesture signal of the top-bottom direction is outputted to the control portion 120. In a case where the display portion 130*a* is displaying the navigation image, the control portion 120 displays an enlarged map image when the fingers are moved upward and displays a reduced map image when the fingers are moved downward. In a case where the display portion 130*a* is displaying the audio image, the control portion 120 turns up a volume when the fingers are moved upward and turns down the volume when the fingers are moved downward by correlating motions of the fingers with operations on the volume adjusting switch. In a case where the display portion 130*a* is displaying the air-conditioning image, the control portion 120 raises the preset temperature when the fingers are moved upward and lowers the preset temperature when the fingers are moved downward by correlating motions of the fingers with operations on the preset temperature switch.

As has been described, in the present embodiment, the sensor 110 is capable of detecting a motion of a finger as a gesture when the driver who is holding the steering wheel 10 stretches at least one of the folded fingers (the forefinger or the middle finger or the both) toward the detection area and moves the finger. The driver is thus able to make an input operation on the vehicle device 130 without having to move the hand off the steering wheel 10 while driving. Consequently, an operation burden incurred with a gesture input can be reduced and hence a contribution to safety of driving can be made.

A detection target of the sensor 110 is set to a space (detection area) within a predetermined range from where the sensor 110 is disposed toward the steering wheel 10. Accordingly, because the fingers are normally in the non-detection area while the driver is holding the steering wheel 10, motions of the fingers are not captured as a gesture. Hence, erroneous recognition can be prevented.

Modifications of First Embodiment

In the first embodiment above, the sensor 110 is disposed to the instrument panel 11 in close proximity to the steering column 10*a* and located so as to oppose the right hand of the driver who is holding the steering wheel 10 with the right and left hands placed at 2 o'clock and 10 o'clock positions respectively when viewed in the vehicle travel direction from the driver's seat. Hence, the optical axis of the sensor 110 extends substantially in a horizontal direction from the instrument panel 11 to in front of (back surface of) the steering wheel 10 (first location of FIG. 2 and FIG. 3).

However, the location of the sensor 110 is not limited to the first location specified above, and the sensor 110 may be located at, for example, a second location through a sixth location as are shown in FIG. 5 through FIG. 9, respectively.

Figure 5:
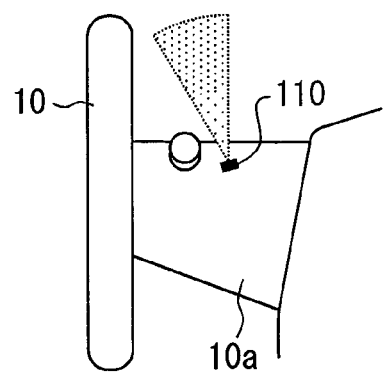
FIG. 5 is a side view indicating a modification of the position (second location) of the sensor.

In the case of the second location as shown in FIG. 5, in contrast to the first location, the sensor 110 is provided to the steering column 10*a* for the optical axis of the sensor 110 to extend substantially upward. Herein, the sensor 110 can be a sensor that captures a motion of the forefinger or the middle finger or the both in a two-dimensional image in addition to the sensor that captures the motion in a three-dimensional image. The two-dimensional image sensor 110 is capable of detecting a finger moving in the right-left direction by crossing the upward optical axis. Accordingly, a gesture to shake a finger in the right-left direction can be adopted as a gesture of a finger.

Figure 6:
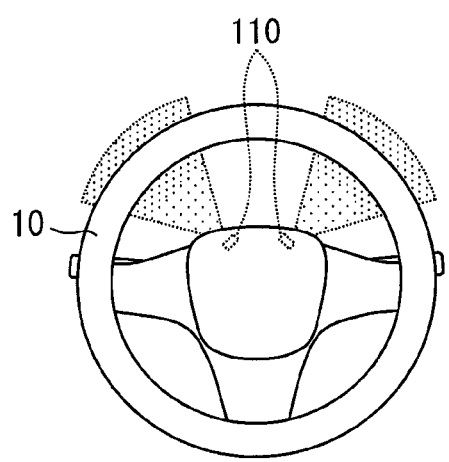
FIG. 6 is a front view indicating another modification of the position (third location) of the sensor.

In the case of the third location as shown in FIG. 6, in contrast to the first location, the sensor 110 is provided to the steering column 10*a* at two points on the right and left sides for the optical axes of the sensors 110 to extend substantially upward in a radially outward direction of the steering wheel 10. Herein, as with the first location, the sensor 110 can be a sensor that captures a motion of the forefinger or the middle finger or the both in a three-dimensional image. Accordingly, gestures to shake a finger in the right-left direction and in the top-bottom direction can be adopted as gestures of a finger.

The fourth location through the sixth location are locations at which the sensor 110 detects a gesture of a ring finger and/or a little finger of the driver who is holding the steering wheel 10 at 8 and 4 o'clock positions.

Figure 7:
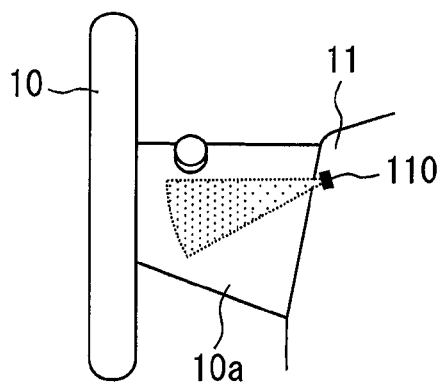
FIG. 7 is a side view indicating still another modification of the position (fourth location) of the sensor.

In the case of the fourth location as shown in FIG. 7, the optical axis of the sensor 110 extends substantially in a horizontal direction as with the first location and the sensor 110 detects a motion of a finger placed lower than a horizontal center of the steering wheel 10. At the fourth location, the three-dimensional image sensor 110 is used and gestures to shake a finger in the right-left direction and in the top-bottom direction can be adopted as gestures of a finger as with the first location.

Figure 8:
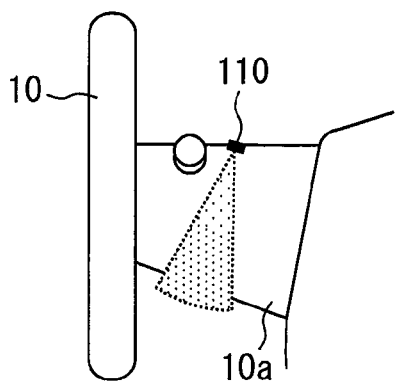
FIG. 8 is a side view indicating still another modification of the position (fifth location) of the sensor.

In the case of the fifth location as shown in FIG. 8, in contrast to the first location, the sensor 110 is provided to the steering column 10a for the optical axis of the sensor 110 to extend substantially downward. Herein, the sensor 110 can be a sensor that captures a motion of the ring finger or the little finger or the both in a two-dimensional image in addition to a sensor that captures the motion in a three-dimensional image. The two-dimensional image sensor 110 is capable of detecting a finger moving in the right-left direction by crossing the downward optical axis. Accordingly, a gesture to shake a finger in the right-left direction can be adopted as a gesture of a finger.

Figure 9:
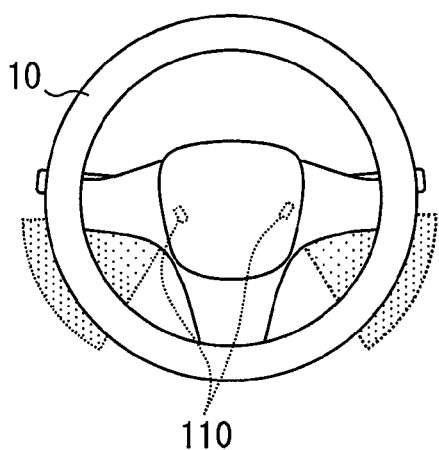
FIG. 9 is a front view indicating still another modification of the position (sixth location) of the sensor.

In the case of the sixth location as shown in FIG. 9, in contrast to the first location, the sensor 110 is provided to the steering column 10a at two points on the right and left sides for the optical axes of the sensors 110 to extend substantially downward in a radially outward direction of the steering wheel 10. Herein, the sensor 110 can be a sensor that captures a motion of the ring finger or the little finger or the both in a three-dimensional image as with the first location. Accordingly, gestures to shake a finger in the right-left direction and in the top-bottom direction can be adopted as gestures of a finger.

A relation between types of the sensors and available gesture operations at the first location of the first embodiment above and the second location through the sixth location is set forth in FIG. 10. In FIG. 10, 2D stands for two-dimensional and 3D stands for three-dimensional.

Second Embodiment

FIG. 11 and FIG. 12 show a detection device 110 and an operation input device 100A of a second embodiment. In contrast to the first embodiment above, the second embodiment is configured to prevent an erroneous input of a gesture when a turn-signal lever 13 is operated.

When the turn-signal lever 13 is operated (an input is made), an operation signal (input signal) is inputted into a sensor 110. The turn-signal lever 13 corresponds to a switch portion of the present disclosure. Because the turn-signal lever 13 is provided to a steering column 10a, when a driver operates the turn-signal lever 13, a finger enters a detection area of the sensor 110. When a motion of a finger during an operation on the turn-signal lever 13 is detected as a gesture in a top-bottom direction, a display content of a display portion 130a may possibly be changed against an intention of the driver.

Figure 13:
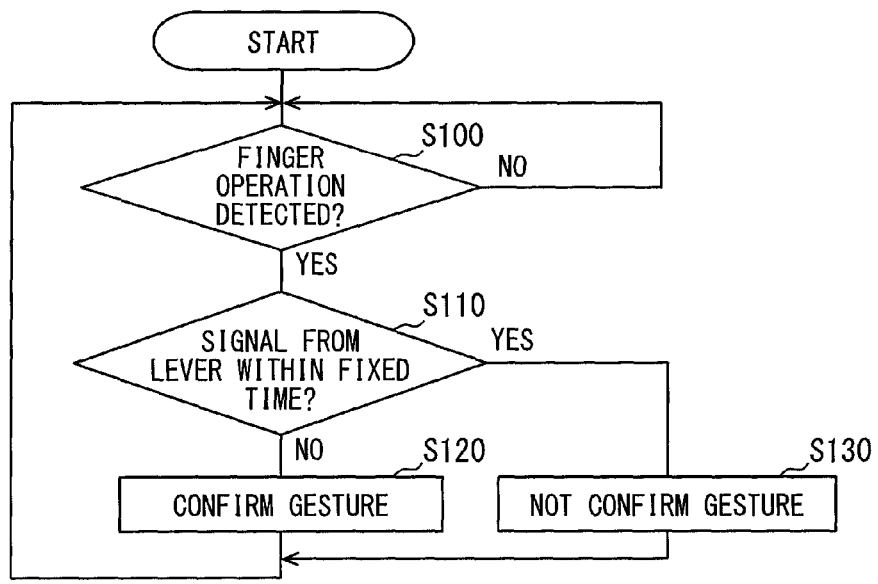
FIG. 13 is a flowchart depicting a control content for gesture recognition in the second embodiment.

The present embodiment prevents such an erroneous input by performing an erroneous input prevention control in accordance with a flowchart of FIG. 13 using the sensor 110.

That is to say, the sensor 110 determines in Step S100 whether a motion of a finger of the driver is detected. When the determination made in Step S100 is positive, the sensor 110 proceeds to Step S110.

In Step S110, the sensor 110 determines whether an operation signal is sent from the turn-signal lever 13 within a constant time set in advance (for example, about 200 ms). When the determination made in Step S110 is negative, the sensor 110 recognizes in Step S120 that a gesture was made on the ground that the detected motion is not an operation on the turn-signal indicator 13 by the driver but a proper gesture of a finger. The sensor 110 therefore outputs a gesture signal to the control portion 120.

On the other hand, when the determination made in Step S110 is positive, the sensor 110 recognizes in Step S130 that a gesture was not made on the ground that the detected motion is not a proper gesture of a finger because the driver operated the turn-signal lever 13. That is to say, the sensor 110 makes the detected gesture invalid and does not output a gesture signal to the control portion 120.

Accordingly, an operation of the driver on the turn-signal lever 13 is not detected as a gesture. Hence, an operation on the turn-signal lever 13 can be prevented from being detected erroneously as an input.

In the present embodiment as described above, an operation signal of the turn-signal lever 13 is inputted into the sensor 110. However, an operation signal inputted into the sensor 110 is not limited to an operation signal of the turn-signal lever 13. For example, in a case where the sensor 110 is disposed at a position corresponding to a left hand of the driver, the present embodiment may be applied by assuming that a windshield wiper lever disposed to the steering column 10a on a left side is the switch portion. That is to say, even in a case where an operation signal of the windshield wiper lever is inputted into the sensor 110, a motion of a finger when the driver operates the windshield wiper lever is not recognized as a gesture. Hence, an operation on the windshield wiper lever can be prevented from being detected erroneously as an input.

Third Embodiment

Figure 14:
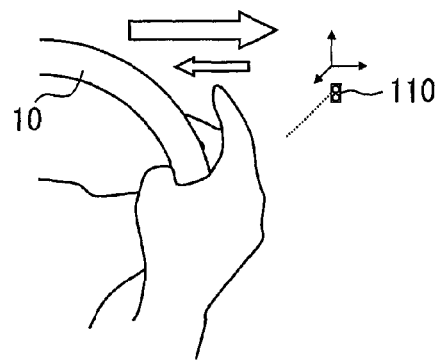
FIG. 14 is a view used to describe a gesture of a finger according to a third embodiment.
Figure 15:
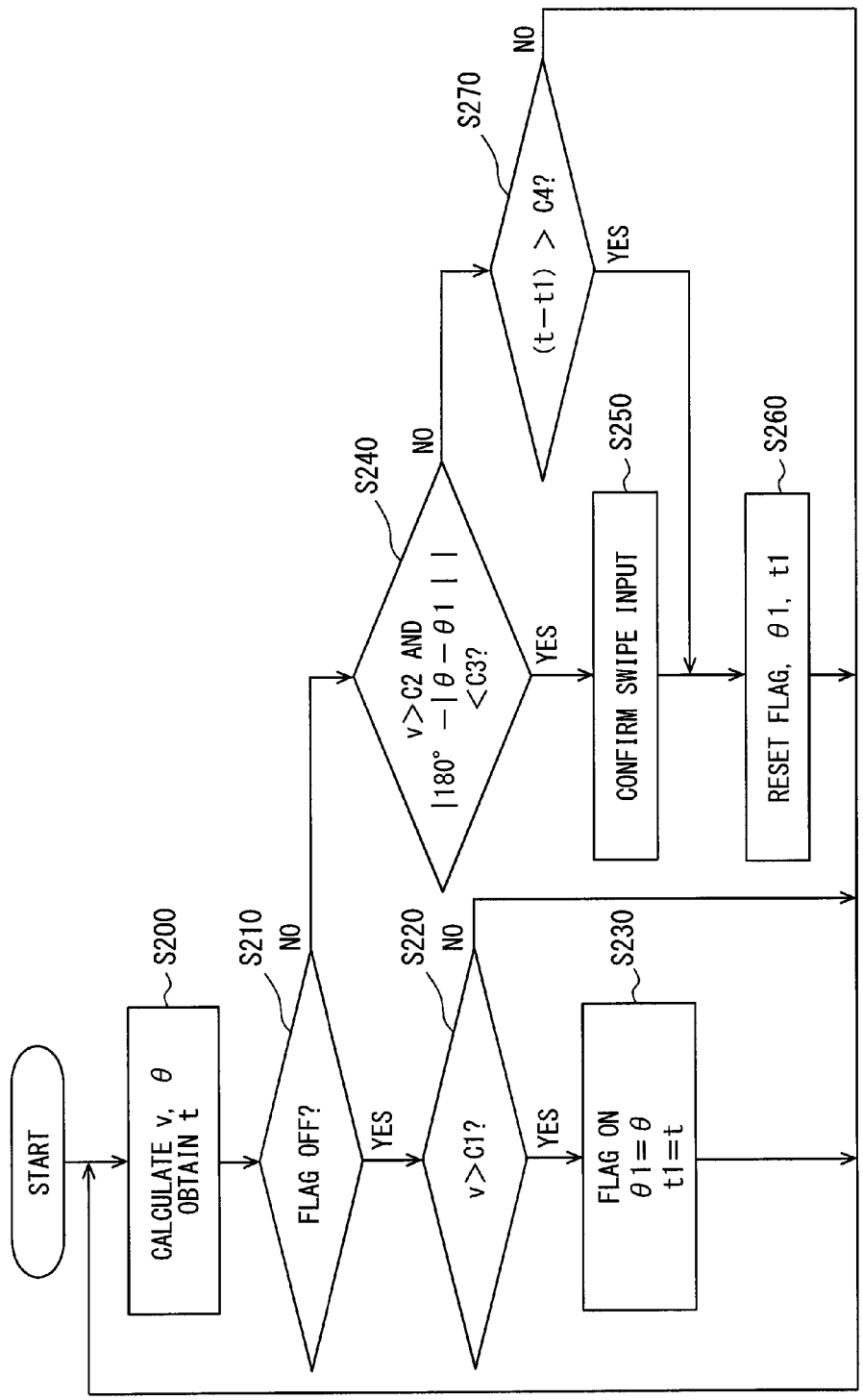
FIG. 15 is a flowchart depicting a control content for gesture recognition in the third embodiment.

A gesture input device 100 of a third embodiment will be described using FIG. 14 through FIG. 16. The gesture input device 100 of the present embodiment operates a vehicle device 130 according to a motion of a particular part of a body of a driver (operator).

A vehicle is provided with a steering wheel 10 used to steer the vehicle, an instrument panel 11 located behind the steering wheel 10 (front side of the vehicle), a combination meter 12 collectively displaying various types of vehicle information and located in the instrument panel 11 so as to oppose an upper half of the steering wheel 10, and so on.

The gesture input device 100 includes an action detection portion 110 and a control portion 120. In the gesture input device 100, the control portion 120 switches a display image on a display portion 130a of the vehicle device 130 and makes an operation input to the the vehicle device 130 according to a motion of the body of the driver detected by the action detection portion 110.

The action detection portion 110 detects a motion of a particular part of the body of the driver. The action detection portion 110 detects the particular part of the body of the driver from an image and detects a motion of the particular part of the body of the driver on the basis of a change in images with time.

The particular part of the body of the driver can be, for example, a finger, a palm, or an arm. In the present embodiment, a finger is the particular part of the body of the driver. The action detection portion 110 can be a sensor, a camera or the like capable of generating two-dimensional images or three-dimensional images. The sensor can be a near infrared sensor using near infrared light, a far infrared sensor using far infrared light, or the like. The camera can be a stereo camera capable of recording information in a depth direction as well by capturing a subject from multiple directions at a time, a ToF (Time of Flight) camera capturing a subject three-dimensionally using a ToF method, or the like. In the present embodiment, a near infrared sensor generating three-dimensional images is used. Hereinafter, the action detection portion 110 is referred to as the sensor 110.

The vehicle device 130 is, for example, an integral unit of a navigation device furnished with an audio function and an air-conditioning input device via which to input an operation condition for a vehicle air-conditioning device. The audio function is, for example, a music playing function and a radio receiver function. The vehicle device 130 includes the display portion 130a and is disposed in the instrument panel 11 at, for example, substantially a center in a vehicle right-left direction.

The display portion 130a is, for example, a liquid crystal display or an organic EL display. The display portion 130a displays a main menu, namely, a mode selection icon 131 in which a radio icon 131a, a navigation icon 131b, a music icon 131c, an air-conditioning icon 131d, and so on are aligned side by side in the right-left direction (FIG. 16).

When the radio icon 131a is selected and determined according to a gesture of a finger described below, the display portion 130a displays a radio operation image. When the navigation icon 131b is selected and determined, the display portion 130a displays a navigation image, such as a map image used for route guidance, a vehicle location image, a destination search image, a destination navigation image by texts or figures, and so on. When the music icon 131c is selected and determined, the display portion 130a displays an audio operation image, such as a song list and a volume adjusting switch. When the air-conditioning icon 131d is selected and determined, the display portion 130a displays an air-conditioning operation image, such as a preset temperature switch, an air volume adjusting switch, a blow-out mode switching switch, an inside and outside air switching switch, and a current operating state.

In the present embodiment, a gesture of a finger in a right-left direction is a gesture to select the respective icons 131a through 131d in the mode selection icon 131 on the display portion 130a. A gesture to move a finger to the right corresponds to an action in one direction of the present disclosure and a gesture to move a finger to the left corresponds to an action in an opposite direction of the present disclosure. The sensor 110 detects a gesture of a finger and outputs a gesture signal to the control portion 120. Hereinafter, a gesture recognition control performed by the control portion 120 will be described in accordance with a flowchart of FIG. 15.

The sensor 110 captures a gesture of a finger of the driver stretched into a detection area (for example, swipe-like motion to the right) in images with time and outputs the captured gesture to the control portion 120 as a gesture signal. In Step S200, the control portion 120 calculates a finger motion speed v and a finger motion direction θ on the basis of the gesture signal and also obtains a time (clock time) t.

In subsequent Step S210, the control portion 120 determines whether a swipe-like operation start flag is OFF. When the swipe-like operation start flag is OFF, it means that a gesture to move a finger in one direction (for example, to the right), that is, a swipe-like operation in one direction is not detected yet. When the determination made in Step S210 is positive, the control portion 120 proceeds to Step S220.

In Step S220, the control portion 120 determines whether the finger motion speed v is higher than a threshold C1 set in advance. When the speed v is higher than the threshold C1, it means that the finger motion speed v is high and the driver is making a swipe-like operation in one direction with a finger. Hence, when the determination made in Step S220 is positive, the control portion 120 proceeds to Step S230. When the determination made in Step S220 is negative (the driver is not making a swipe-like operation in one direction with a finger), the control portion 120 returns to Step S200.

In Step S230, the control portion 120 sets the swipe-like operation start flag ON. When the swipe-like operation start flag is ON, it means that a swipe-like operation in one direction (for example, to the right) is detected. Also, the control portion 120 stores the finger motion direction θ when the swipe-like operation start flag is set ON as θ1. The direction θ ranges from −180° to +180°. The control portion 120 also stores the time (clock time) t when the swipe-like operation start flag is set ON as t1. Subsequently, the control portion 120 returns to Step S200.

Figure 16:
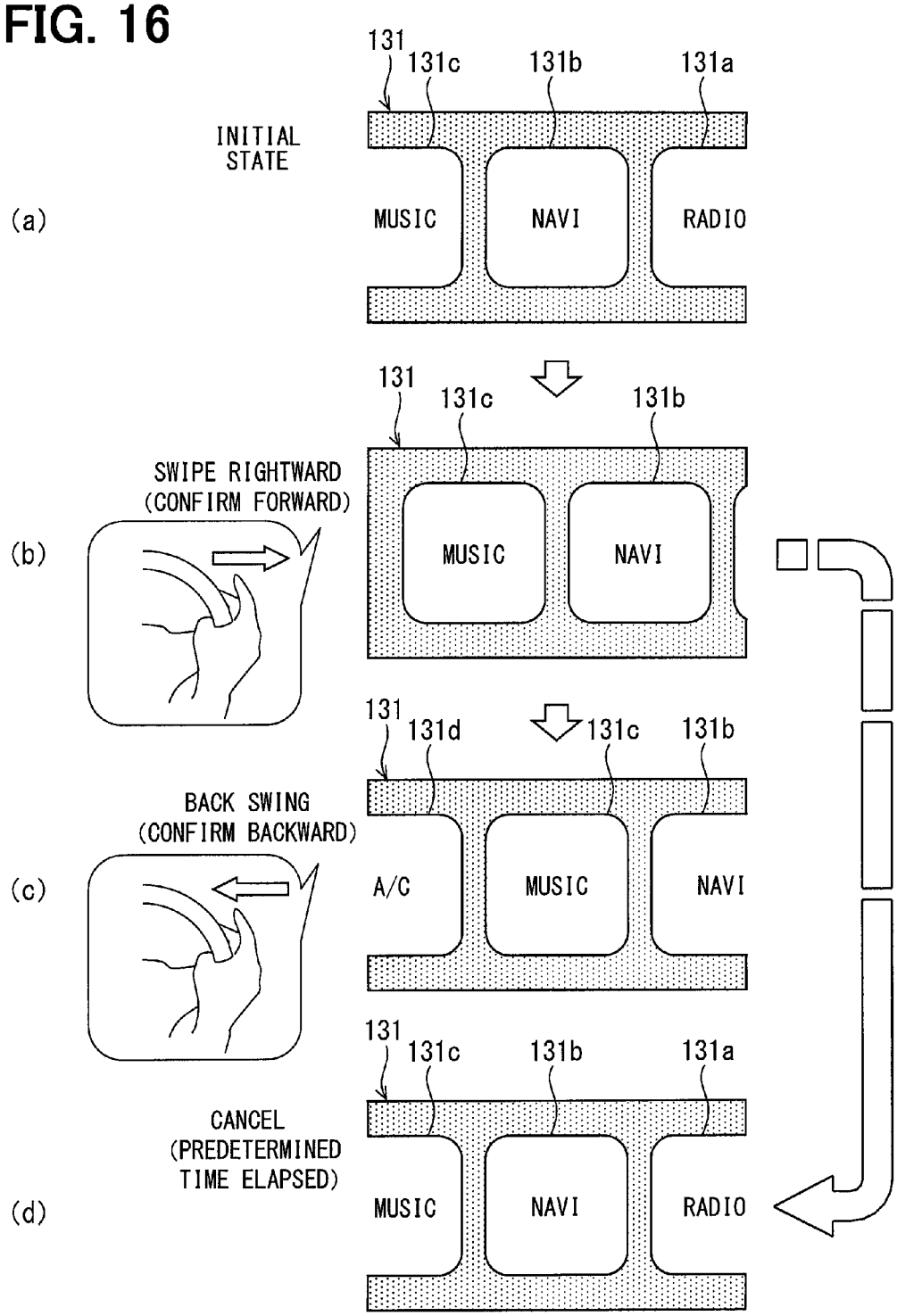
FIG. 16 is views used to describe in which manner menu icons are scrolled with a gesture in the third embodiment.

When a swipe-like operation in one direction is detected in Step S230, as is shown in (b) of FIG. 16, the respective icons 131a through 131d in the mode selection icon 131 on the display portion 130a are scrolled in one direction as much as half a dimension in a right-left direction by the control portion 120. In other words, when the driver moves the finger in one direction (for example, to the right) as a swipe-like operation of the finger, the respective icons 131a through 131d are scrolled by half the dimension in one direction (for example, to the right).

On the other hand, when the determination made in Step S210 is negative, the control portion 120 proceeds to Step S240. That is to say, when the control portion 120 proceeds to Step S210 again after the control portion 120 sets the swipe-like operation start flag ON in Step S230 by repeating the control, the control portion 120 makes a negative determination. In short, a determination as follows is made in Step S240 on the condition that the sensor 110 has detected a swipe-like operation in one direction.

In Step S240, the control portion 120 determines whether the finger motion speed v is higher than a threshold C2 set in advance and the finger motion direction (|180°−|θ−θ1||) is smaller than a threshold C3. The determination on the finger motion direction in Step S240 is to determine whether the finger motion direction is an opposite direction to the direction θ1 stored in Step S230 within a predetermined range (smaller than threshold C3). The threshold C2 is set to a smaller value than the threshold C1 because a swipe-like operation in the opposite direction may possibly be slightly slower than the first swipe-like operation in one direction.

The determination step in Step S220 and the determination step in S240 correspond to a determination portion of the present disclosure.

When the determination made in Step S240 is positive, it means that the driver made the swipe-like operation of the finger in one direction and the swipe-like operation in the opposite direction. Hence, according to the both swipe-like operations, the control portion 120 finalizes an input by the swipe-like operations in Step S250. Herein, a time condition (time condition exceeding a threshold C4) in Step S270 described below does not apply in Step S250. In other words, the control portion 120 recognizes that a single gesture is made on the ground that the both swipe-like operations are detected in series within a predetermined time (less than the threshold C4). The finalizing step in Step S250 corresponds to a recognition portion of the present disclosure.

When an input by the swipe-like operations is finalized in Step S250, as is shown in (c) of FIG. 16, the respective icons 131a through 131d in the mode selection icon 131 on the display portion 130a are scrolled further by half the dimension in one direction by the control portion 120. That is to say, the respective icons 131a through 131d are scrolled by one icon in one direction (for example, to the right) when the driver moves a finger in one direction (for example, to the right) and subsequently in an opposite direction (for example, to the left) as the swipe-like operations of a finger.

In Step S260, the control portion 120 resets the swipe-like operation start flag, the finger motion direction θ1, and the time t1 and returns to Step S200. In short, the control portion 120 resets all the settings to an initial state and starts a recognition control again on the basis of swipe-like operations of a finger.

When the determination made in Step S240 is negative, the control portion 120 proceeds to Step S270 in which the control portion 120 confirms an elapsed time state. That is to say, the control portion 120 calculates an elapsed time by subtracting the time (clock time) t1 when the swipe-like operation start flag was set ON in Step S230 from the current time (clock time) t and compares the calculated elapsed time with the threshold C4 set in advance. When the elapsed time is longer than the threshold C4, the control portion 120 proceeds to Step S260 without finalizing an input by the swipe-like operations made in Step S250. On the other hand, when the elapsed time is shorter than the threshold C4, the control portion 120 returns to Step S200. The elapsed time corresponds to a predetermined time of the present disclosure.

That is to say, the control portion 120 finalizes an input by the swipe-like operations in Step S250 because the control portion 120 determines in Step S240 that a swipe-like operation in the opposite direction is detected after a detection of a swipe-like operation in one direction in series within the predetermined time.

Even when a swipe-like operation in one direction is detected in Step S230, the control portion 120 resets (erase a history) in Step S260 unless a swipe-like operation in the opposite direction is detected in series within the predetermined time. That is, the control portion 120 does not finalize an input by the swipe-like operation. In such a case, as is shown in (d) of FIG. 16, the respective icons 131a through 131d scrolled by half the dimension in one direction as in (b) of FIG. 16 are undone and scrolled back to the original positions. In Step S260 to which advancement is made from Step S270 corresponds to a reset portion of the present disclosure.

As has been described, in the present embodiment, the control portion 120 recognizes motions of a finger of the driver as a single gesture when an action in one direction and an action in the opposite direction are detected in series within the predetermined time set in advice by using the determination portion (S220, S240) and the recognition portion (S250).

Accordingly, an action in one direction or an action in the opposite direction is not recognized independently. In other words, the user becomes able to make a desired single input operation with a reciprocating action by making an action in one direction and an action in the opposite direction as a single gesture. Hence, an input by an action in one direction and an input by an action in the opposite direction alternate in the reciprocating action without confusion and single input operations can be made in series by repeating the reciprocating action as one unit.

Even when the driver moves a finger unconsciously when making an action of some sort, such a motion of the finger is not recognized as a single gesture unless both of an action in one direction and an action in the opposite direction are detected. Hence, making an unintended input operation can be limited.

The control portion 120 erases a history of an action in one direction by using the reset portion (S260) unless an action in one direction and an action in the opposite direction are detected in series within the predetermined time set in advance as motions of a finger of the driver. Hence, an input is not made unless the driver makes an action in the opposite direction following an action in one direction within the predetermined time set in advice. Consequently, an input of an erroneous action can be prevented in a reliable manner.

In the manner as described above, according to the present embodiment, a degree of recognition accuracy of an input by a gesture of the driver can be increased and hence ease of operation can be enhanced.

Fourth Embodiment

Figure 17:
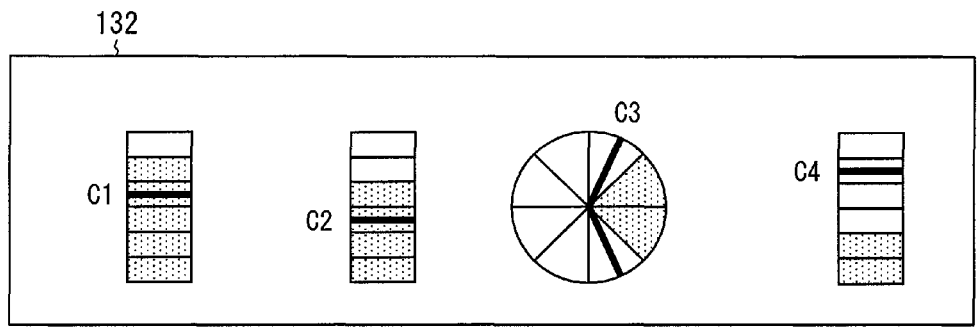
FIG. 17 is a view used to describe an example of a display on a display portion when respective thresholds are changed in a fourth embodiment.

A fourth embodiment will be described using FIG. 17. In contrast to the third embodiment above, the fourth embodiment is configured in such a manner that respective thresholds C1 through C4 used to determine a motion of a finger can be changed by an input operation of a driver. The respective thresholds C1 through C4 correspond to a determination condition of the present disclosure.

A display portion 130a of a vehicle device 130 displays a setting change screen 132 with which the driver can change settings of the respective thresholds C1 through C4 by a predetermined operation. For example, the setting change screen 132 shows the present thresholds C1 through C4 in comparison with corresponding initial set values (indicated by dots in FIG. 17). The driver is able to make an input to change the respective thresholds C1 through C4 into a sensor 110 in consideration of own patterns of behavior and preference when moving a finger. The setting change screen 132 is, for example, a screen using a capacitance electrode with a touch input function. In order to make a changing input, the driver touches the setting change screen 132 with a fingertip at positions of the respective thresholds C1 through C4 and slides the fingertip in a direction in which the driver wishes to change the values. The setting change screen 132 on the display portion 130a corresponds to a changing portion of the present disclosure.

In the manner as above, the driver is able to change the thresholds C1 through C4 used to determine a motion of a finger to suit patterns of behavior and preference of the driver. Hence, an input by a gesture can be more convenient for the driver. In particular, the thresholds C1 and C2 used to determine a finger motion speed (movement speed) v are crucial determination values when capturing a motion of a finger. Hence, making the settings of such thresholds C1 and C2 changeable can significantly contribute to making an input by a gesture more convenient for the driver.

Fifth Embodiment

A gesture input device 300 of a fifth embodiment will be described using FIG. 20 through FIG. 23. The gesture input device 300 of the present embodiment operates a vehicle device 130 according to a motion of a particular part of a body of a driver (operator).

A vehicle is provided with a steering wheel 10 used to steer the vehicle, a steering shaft 311 transmitting an operation force of the steering wheel 10 to an unillustrated steering gear, an instrument panel 312 located behind the steering wheel 10 (a front side of the vehicle), a combination meter 313 collectively displaying various vehicle information and located in the instrument panel 312 so as to oppose an upper half of the steering wheel 10, and so on.

The gesture input device 300 includes a detection portion 110, a steering angle sensor 320, an electronic control unit 330, and so on. The gesture input device 300 switches a display image on a display portion 130a of the vehicle device 130 and makes an operation input to the vehicle device 130 under the control of the electronic control unit 330 according to a motion of the body of the driver detected by the detection portion 110.

The detection portion 110 detects a motion of a particular part of the body of the driver. The detection portion 110 detects a particular part of the body of the driver in an image and detects a motion of the particular part of the body of the driver on the basis of a change in images with time.

A particular part of the body of the driver can be, for example, a finger, a palm, or an arm. In the present embodiment, a finger is the particular part of the body of the driver. The detection portion 110 can be a sensor, a camera or the like capable of generating two-dimensional images or three-dimensional images. The sensor can be, for example, a near infrared sensor using near infrared light or a far infrared sensor using far infrared light. The camera can be, for example, a stereo camera capable of recording information in a depth direction as well by capturing a subject from multiple directions at a time or a ToF (Time of Flight) camera capturing a subject three-dimensionally using a ToF method. In the present embodiment, a near infrared sensor generating three-dimensional images is used. Hereinafter, the detection portion 110 is referred to as the sensor 110.

Figure 20:
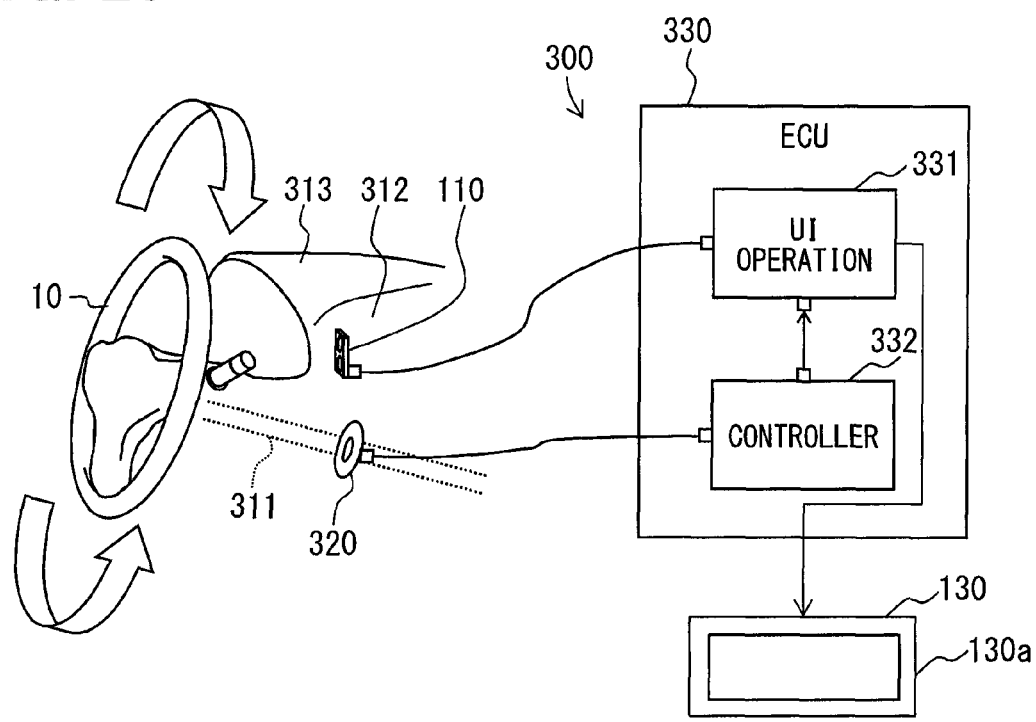
FIG. 20 is a schematic view showing a gesture input device according to a fifth embodiment.

As is shown in FIG. 20, the sensor 110 is disposed to the instrument panel 312 located behind the steering wheel 10 of the vehicle in close proximity to the combination meter 313. More specifically, the sensor 110 is located so as to oppose a right hand of the driver who is holding the steering wheel 10 with right and left hands placed at 10 and 2 o'clock positions respectively when viewed in a vehicle travel direction from a driver's seat. Hence, an optical axis of the sensor 110 extends substantially in a horizontal direction from the instrument panel 312 to in front of (back surface of) the steering wheel 10.

A detection target region of the sensor 110 is a spatial region within a predetermined range from where the sensor 110 is disposed toward the steering wheel 10. Hereinafter, the target region is referred to as the detection area. A space between a tip end of the detection area and the back surface of the steering wheel 10 is a non-detection area. The non-detection area is an area within which fingers holding the steering wheel 10 are located during a normal driving operation. Accordingly, motions of the fingers holding the steering wheel 10 are not detected by the sensor 110.

The detection area is therefore an area within which a motion of any finger of the driver is detected when the finger enters from the non-detection area. For example, when the driver stretches a right forefinger and a right middle finger together or the right forefinger or the right middle finger alone toward the sensor 110, each finger enters the detection area. The sensor 110 thus detects a motion of the finger of the right hand of the driver.

Various patterns may be preliminary assigned as motions of a finger (hereinafter, referred to as a gesture). However, gestures can be to shake a finger in a right-left direction or to shake a finger in a top-bottom direction in air, for example. The gestures resemble, for example, a swipe operation on a screen of a smartphone. A gesture signal of a finger detected by the sensor 110 is outputted to a UI (User Interface) operation portion 331 described below.

The steering angle sensor 320 is a sensor detecting a signal corresponding to a rotation amount when the steering wheel 10 is steered (rotationally operated), that is, a signal corresponding to a steering angle θ, and provided to the steering shaft 311. The steering angle signal detected by the steering angle sensor 320 is outputted to a control portion 332 described below.

The electronic control unit 330 receives the gesture signal from the sensor 110 and the steering angle signal from the steering angle sensor 320 and performs a display control on the display portion 130a of the vehicle device 130 and an operation control on the vehicle device 130. The electronic control unit 330 includes the UI operation unit 331 and the control portion 332.

In the UI operation portion 331, control contents according to finger gesture signals from the sensor 110 are preliminarily determined. That is to say, the UI operation portion 331 generates a display image necessary for the display portion 130a of the vehicle device 130 and further switches a display image while changing an operating state of the vehicle device 130 according to finger gesture signals.

Upon receipt of the steering angle signal from the steering angle sensor 320, the control portion 332 calculates an angular velocity ω of the steering wheel 10 and switches operations to enable and disable an input of the gesture signal from the sensor 110 into the UI operation portion 331 according to the calculated angular velocity ω. The switching control performed by the control portion 332 will be described in detail below.

The vehicle device 130 is, for example, an integral unit of a navigation device furnished with an audio function and an air-conditioning input device via which to input an operating condition for a vehicle air-conditioning device. The audio function is, for example, a music playing function and a radio receiver function. The vehicle device 130 includes the display portion 130a and is disposed in the instrument panel 312 at, for example, substantially a center in a vehicle right-left direction.

The display portion 130a is, for example, a liquid crystal display or an organic EL display. A navigation image, an audio operation image, an air-conditioning operation image, and so on are switched and displayed on the display portion 130a according to a gesture of a finger of the driver by the UI operation portion 331. The driver is able to make an operation input by changing a state of an operation icon or the like to a determined state with a different gesture.

In the present embodiment, the control portion 332 performs the switching control to enable or disable an input of the gesture signal from the sensor 110 into the UI operation 331 on the basis of the angular velocity ω when the driver steers the steering wheel 10 with the aim of increasing safety of driving and making an input by a gesture of a finger more convenient. The switching control will be described in detail below using FIG. 21 through FIG. 23.

Figure 21:
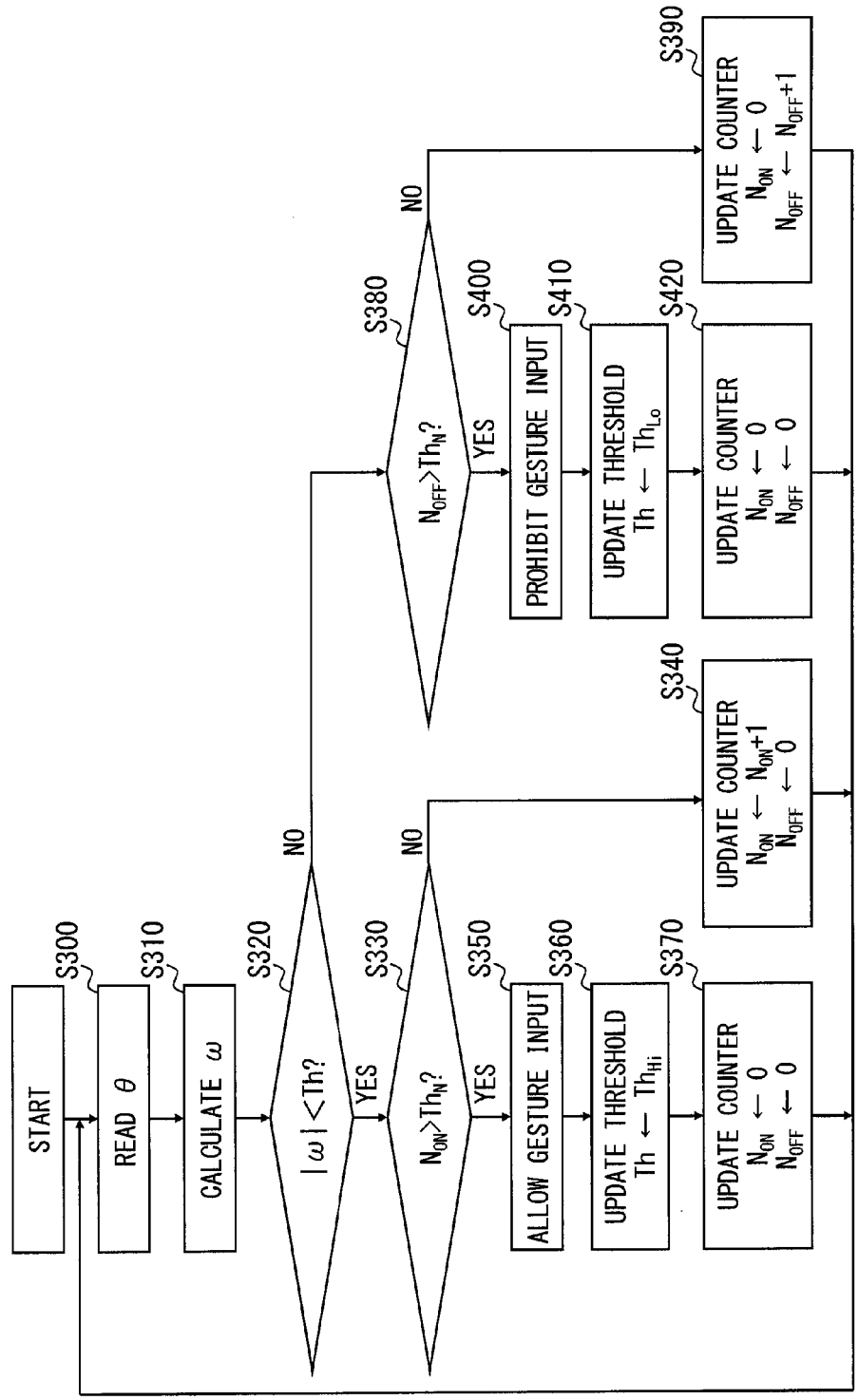
FIG. 21 is a flowchart depicting a content of a switching control performed by a control portion to enable or disable a gesture input.

The control portion 332 repetitively performs a control flow in FIG. 21 at every predetermined time. The control portion 332 reads out the steering angle signal (steering angle θ) outputted from the steering angle sensor 320 first in Step S300 and calculates an angular velocity ω on the basis of the steering angle signal in Step S310. The angular velocity ω is calculated as a variation of the steering angle θ (a differential value of the steering angle θ) with respect to a time.

In subsequent Step S320, the control portion 332 determines whether an absolute value of the calculated angular velocity ω is smaller than a threshold Th set in advance. The threshold Th is set to a value at a level low enough to determine that the driver is not practically making a rotational operation on the steering wheel 10.

When the determination made in Step S320 is positive, the control portion 332 determines in Step S330 whether a value of a counter $N_{on}$ corresponding to an elapsed time is larger than a threshold $Th_N$ set in advance. The threshold $Th_N$ corresponds to a predetermined time of the present disclosure. An initial value of the counter $N_{ON}$ is set to 0.

When the determination made in Step S330 is negative, that is, when it is determined that a value of the counter $N_{ON}$ is equal to or smaller than the threshold $Th_N$, the control portion 332 proceeds to Step S340, in which the control portion 332 updates the counter $N_{ON}$ used for a determination in Step S330 and a counter $N_{OFF}$ used for a determination in Step S380 described below. Herein, the counter $N_{ON}$ is incremented by one whereas the counter $N_{OFF}$ is reset to 0. Subsequently, the control portion 332 returns to Step S300.

After the control portion 332 increments the counter $N_{ON}$ in Step S340, the control portion 332 repeats Step S300 through Step S320 again. When the determination made again in Step S330 is positive, that is, when it is determined that a value of the counter $N_{ON}$ is larger than the threshold $Th_N$, the control portion 332 proceeds to Step S350.

In Step S350, the control portion 332 enables an input of the gesture signal from the sensor 110 into the UI operation portion 331. That is to say, the control portion 332 enables an input of a gesture of the driver when the angular velocity ω obtained from the steering angle θ remains smaller than the threshold Th for a predetermined time (threshold $Th_N$) or longer.

Figure 22:
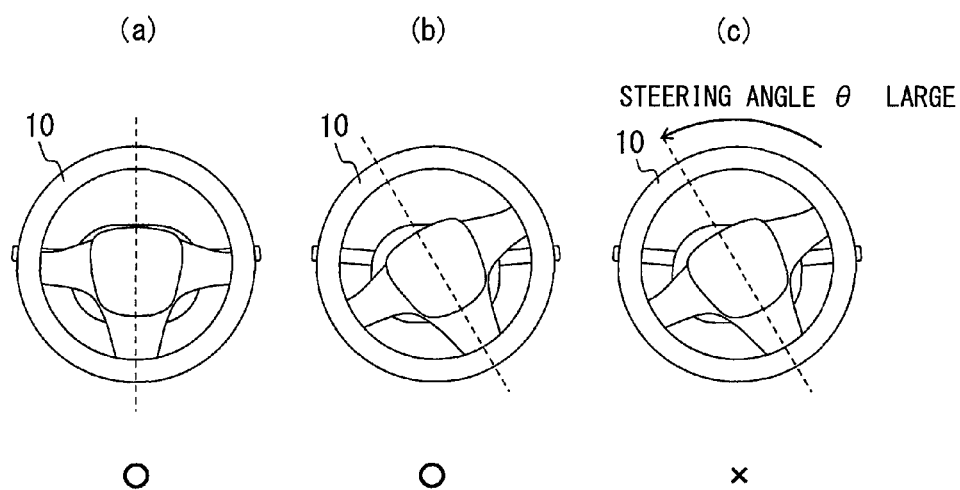
FIG. 22 is views used to describe when a gesture input is enabled or disabled according to a rotation state of a steering wheel.

More specifically, an example of a driving state in which an input of the gesture signal is enabled is a case where the vehicle is traveling a long straight road and the driver does not make a rotational operation on the steering wheel 10 as shown in (a) of FIG. 22. The example also includes a case where the vehicle is traveling a gentle long curve and the driver makes a slight rotational operation on the steering wheel 10 as shown in (b) of FIG. 22 and then keeps the steering wheel 10 at the rotated position later for a considerable time. The example further includes a case where the vehicle is parked with the steering wheel 10 turned toward a curb also as shown in (b) of FIG. 22 in order to prevent the vehicle from darting forward in case of rear-end collision. In the manner as above, an input by a gesture of the driver is enabled unless the driver makes a considerable rotational operation on the steering wheel 10.

In Step S360, the control portion 332 updates a value of the threshold Th to $Th_{Hi}$. Herein, $Th_{Hi}$ is an upper limit threshold of the threshold Th. The upper limit threshold $Th_{Hi}$ is, for example, a threshold set by adding a predetermined value to the threshold Th. Hence, when the control portion 332 returns to Step S300 after the control portion 332 enables a gesture input in Step S350 and performs the processing in Steps S360 and S370 and makes a determination again in Step S320, the control portion 332 uses the upper limit threshold $Th_{Hi}$ as the threshold Th.

In subsequent Step S370, the control portion 332 updates the counter $N_{ON}$ used for a determination in Step S330 and the counter $N_{OFF}$ used for a determination in Step S380 described below. Herein, an elapsed time counted thus far is cleared by resetting both of the counter $N_{ON}$ and the counter $N_{OFF}$ to 0. Subsequently, the control portion 332 returns to Step S300.

On the other hand, when the determination made in Step S320 is negative, that is, when the angular velocity ω is as high as or higher than the threshold Th, the control portion 332 proceeds to Step S380. In Step S380, the control portion 332 determines whether a value of the counter $N_{OFF}$ corresponding to an elapsed time is larger than the threshold $Th_N$. An initial value of the counter $N_{OFF}$ is set to 0.

When the determination made in Step S380 is negative, that is, when it is determined that a value of the counter $N_{OFF}$ is as low as or lower than the threshold $Th_N$, the control portion 332 updates the counter $N_{ON}$ and the counter $N_{OFF}$ in Step S390. Herein, the counter $N_{ON}$ is reset to 0 whereas the counter $N_{OFF}$ is incremented by one. Subsequently, the control portion 332 returns to Step S300.

After the control portion 332 increments the counter $N_{OFF}$ in Step S390, the control portion 332 repeats Step S300 through Step S320 again. When the determination made again in S380 is positive, that is, when it is determined that the value of the counter $N_{OFF}$ is larger than the threshold $Th_N$, the control portion 332 proceeds to Step S400.

In Step S400, the control portion 332 disables an input of the gesture signal from the sensor 110 into the UI operation portion 331. That is to say, in a case where the angular velocity ω obtained from the steering angle θ remains as high as or higher than the threshold Th for a predetermined time (threshold $Th_N$) or longer, the control portion 332 disables an input of a gesture of the driver.

More specifically, an example of a driving state in which an input of the gesture signal is disabled is a case where the vehicle is travelling a sharp curve and the driver is making a considerably large rotational operation (or repeating the rotational operation) on the steering wheel 10 as is shown in (c) of FIG. 22. In the manner as above, an input by a gesture of the driver is disabled when a considerably large rotational operation is made on the steering wheel 10.

In Step S410, the control portion 332 updates a value of the threshold Th to $Th_{Lo}$. Herein, $Th_{Lo}$ is a lower limit threshold of the threshold Th. The lower limit threshold $Th_{Lo}$ is, for example, a threshold set by subtracting a predetermined value from the threshold Th. Hence, when the control portion 332 returns to Step S300 after the control portion 332 disables a gesture input in Step S400 and performs the processing in Steps S410 and S420 and makes a determination again in Step S320, the control portion 332 uses the lower limit threshold $Th_{Lo}$ as the threshold Th.

Figure 23:
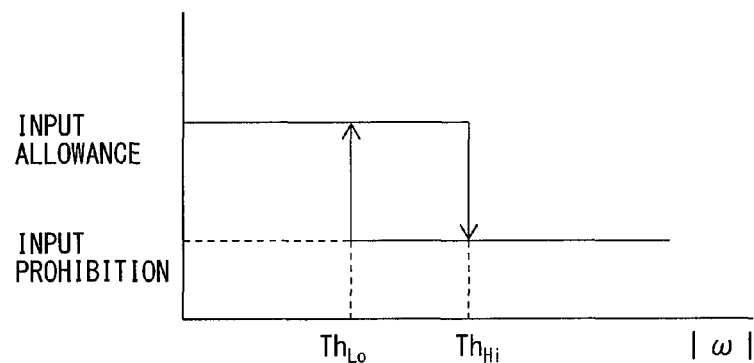
FIG. 23 is a graph showing thresholds used to determine how high an angular velocity is.

That is to say, as is shown in FIG. 23, a determination having a hysteresis due to the upper limit threshold $Th_{Hi}$ and the lower limit threshold $Th_{Lo}$ is a basis of a determination made depending on how high the angular velocity ω is as to whether a gesture input is enabled or disabled. More specifically, the upper limit threshold $Th_{Hi}$ is used as a determination value when an input is disabled in a case where the angular velocity ω is increasing during an input enabled state, and the lower limit threshold $Th_{Lo}$ is used as a determination value when an input is enabled in a case where the angular velocity ω is decreasing during an input disabled state.

In subsequent Step S420, the control portion 332 updates the counter $N_{ON}$ used for a determination in Step S330 and the counter $N_{OFF}$ used for a determination in Step S380. Herein, an elapsed time counted thus far is cleared by resetting both of the counter $N_{ON}$ and the counter $N_{OFF}$ to 0. Subsequently, the control portion 332 returns to Step S300.

As has been described, in the present embodiment, the control portion 332 enables or disables an input of a gesture detected by the sensor 110 according to the angular velocity ω obtained from the steering angle θ detected by the steering angle sensor 320. The control portion 332 disables an input of the gesture when the angular velocity ω is as high as or higher than the threshold Th.

Accordingly, when the angular velocity ω obtained from the steering angle sensor 320 is as high as or higher than the threshold Th, it means that the driver is making a considerably large rotational operation on the steering wheel 10. The control portion 332 therefore disables an input of a gesture. Hence, because the driver is able to concentrate on the driving of the vehicle, a contribution to safety of driving can be made.

On the other hand, when the angular velocity ω obtained from the steering angle sensor 320 is lower than the threshold Th, a rotational operation on the steering wheel 10 by the driver is small and a sufficient time is left for the driver to make a gesture. By enabling an input of a gesture as originally designed in such a case, an input by a gesture of the driver can be more convenient.

The control portion 332 disables an input of a gesture when the angular velocity ω remains as high as or higher than the threshold Th for a predetermined time ($Th_N$) set in advance or longer. Consequently, a determination result to disable an input of a gesture can be more reliable.

The threshold Th includes the upper limit threshold $Th_{Hi}$ as a determination value used when an input of a gesture is disabled because the angular velocity ω is increased and the lower limit threshold $Th_{Lo}$ used as a determination value when an input of the gesture is enabled because the angular velocity ω is decreased. That is to say, the control portion 332 updates the threshold Th to the upper limit threshold $Th_{Hi}$ in Step S360 and updates the threshold Th to the lower limit threshold $Th_{Lo}$ in Step S410.

In the manner as above, a determination having a hysteresis due to the upper limit threshold $Th_{Hi}$ to disable an input of a gesture and the lower limit threshold $Th_{Lo}$ to enable an input of a gesture can be the basis of a determination as to whether an input is enabled or disabled. Hence, contrary to a case where the threshold Th alone is provided, a determination to enable or disable an input is not frequently overturned in the vicinity of the threshold Th. Hence, a determination can be made in a stable manner.

Other Embodiments

In the respective embodiments described above, the detection device 110 is a near infrared sensor or a far infrared sensor. However, besides the near and far infrared sensors, a stereo camera capable of recording information in a depth direction as well by capturing a subject from multiple directions at a time, a ToF (Time of Flight) camera capturing a subject three-dimensionally using a ToF method and the like are also available.

Also, motions in the right-left direction and motions in the top-bottom direction are defined as gestures of a finger. However, gestures are not limited to the motions defined as above. A gesture in a diagonal direction, a gesture in a front-rear direction, and the like may be assigned in consideration of a positional relation between a finger and the sensor 110.

Further, control contents and detected gestures are not necessarily correlated with each other as described in the embodiments above and can be correlated with each other in various manners.

Figure 18:
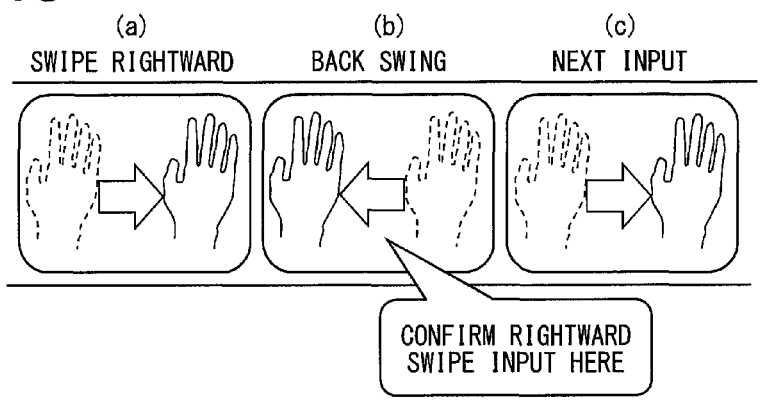
FIG. 18 is views used to describe modifications of the gesture.

The embodiments above have described a case where a finger of the driver is a particular part of the body. However, a particular part of the body is not limited to a finger and can be a palm or an arm of the driver instead. For example, in a case where the palm is a particular part of the body, as are shown in FIG. 18A through FIG. 18C, the driver may put the palm over the sensor 110 and sweep the palm to the right or to the left. The sensor 110 recognizes the sweep operation to the right and the sweep operation to the left (returning operation) as a single gesture and finalizes the first sweep operation to the right. The driver is then requested to make a following input.

Figure 19:
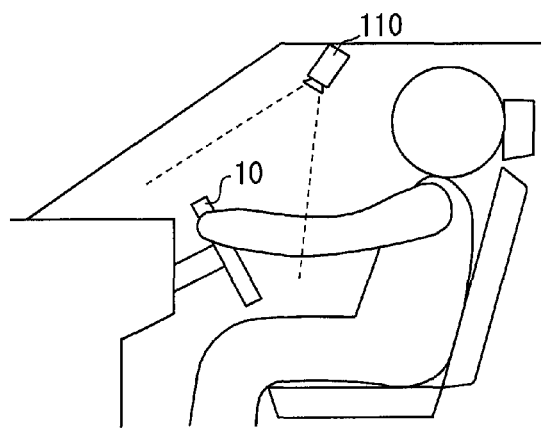
FIG. 19 is a view used to describe a modification of a position of a sensor.

The sensor 110 is not necessarily located in the instrument panel 11. Alternatively, as is shown in FIG. 19, the sensor 110 may be disposed on a ceiling of the vehicle or the like to detect a position of a finger, a palm, or an arm of the driver, for example.

A motion (gesture) of a particular part of the body is not limited to an action in the right-left direction. When the driver is capable of making a reciprocating action, actions in the top-bottom direction, the front-rear direction, a diagonal direction, a rotational direction, and so on may also be applicable in consideration of a positional relation between a particular part of the body and the sensor 110.

An operator as a subject is not limited to the driver and may be an occupant seated on a front passenger's seat. In such a case, the occupant is also able to operate various vehicle devices because the sensor 110 is capable of recognizing the various gestures made by the occupant.

What is claimed is:

1. A detection device installed to a vehicle to detect a gesture of a finger of an operator, comprising:
   a detection portion disposed to a steering column behind a steering wheel of the vehicle or in close proximity to the steering column to detect a space within a predetermined range toward the steering wheel; and
   a switch portion arranged behind the steering wheel and operated by the operator, the switch portion inputting an input signal into the detection portion,
   wherein
   the detection portion determines whether the input signal is inputted from the switch portion within a fixed time period after the detection portion detects the gesture of the finger of the operator,
   the gesture is made valid when the input signal fails to be inputted into the detection portion, and
   the gesture is made invalid when the input signal is inputted into the detection portion.

\* \* \* \* \*